United States Patent Office 3,598,781
Patented Aug. 10, 1971

3,598,781
ADHESIVE VINYL CHLORIDE PLASTISOLS CONTAINING CALCIUM OR MAGNESIUM OXIDE
Lawrence Edward Shadbolt, London, England, assignor to Lever Brothers Company, New York, N.Y.
No Drawing. Continuation-in-part of application Ser. No. 684,487, Nov. 20, 1967. This application Aug. 2, 1969, Ser. No. 852,479
Claims priority, application Great Britain, Nov. 28, 1966, 53,129/66
Int. Cl. C08f 45/38
U.S. Cl. 260—31.8R        2 Claims

ABSTRACT OF THE DISCLOSURE

The present invention relates to a heat curable adhesive plastisol containing polyvinyl chloride or a vinyl chloride co-polymer, a plasticiser, an unsaturated monomeric ester, a curing catalyst and 10–50% w./w. alkaline earth metal oxide which can serve to form an adhesive bond between two substrates. The strength of this bond is developed by a heat curing process and is retained after immersion in lubricating oil at 130–140° C. for a period of about 500 hours.

---

This application is a continuation-in-part of an application Ser. No. 684,487 filed on Nov. 20, 1967, now abandoned.

This invention relates to heat curable adhesive plastisols.

More particularly this invention is concerned with a plastisol based on polyvinyl chloride or a co-polymer of vinyl chloride and a reactive monomeric ester, which can serve to form an adhesive bond between two substrates. The strength of this adhesive bond is developed by a heat curing process.

One particular application of this type of plastisol lies in the manufacture of oil filter assemblies wherein a filter member, usually of resin impregnated paper is bonded to a metal end cap. It is here necessary that the bond maintain its efficiency for a period of up to about 500 hours while immersed in lubricating oil at temperatures of 130° to 140° C. At these temperatures polyvinyl chloride and its co-polymers tend to be thermally unstable and decompose with the formation of acidic byproducts which corrode the metal components of the filter assembly and reduce the strength of the adhesive bond.

It is customary to add stabilisers to plastisols to inhibit or at least minimise any thermal degradation that occurs when they are processed. A very wide range of stabilisers has been proposed including, for example lead, cadmium or alkaline earth soaps, basic lead compounds, organo-tin compounds or epoxy compounds. A common feature of these materials is that they act as acid acceptors.

Such stabilisers will adequately minimise thermal degradation during the processing of plastisols but they are not effective in preventing degradation of systems obtained from plastisols that are to be exposed for a prolonged period of time to working temperatures of about 130–140° C. Thus assemblies that have been bonded together with the aid of a plastisol tend to break apart at these working temperatures and any metal member becomes badly corroded.

Endeavours have been made to overcome this defect by the incorporation of large quantities of calcium carbonate into the plastisol.

Failure of the adhesive bond still occurs, however, after about 100 to 200 hours exposure to the working temperature. The strength of the adhesive bond is, however, surprisingly maintained for at least 500 hours at 130–140° C. when similar amounts of an alkaline earth oxide are incorporated into the plastisol.

This invention accordingly provides a heat curable adhesive plastisol comprising polyvinyl chloride or a vinyl chloride co-polymer, a plasticiser, an unsaturated monomeric ester, a curing catalyst and 10–50% w./w. alkaline earth metal oxide as an adhesion promoter.

The polymeric material which is used in this plastisol is polyvinyl chloride or a co-polymer of vinyl chloride and minor proportions of vinyl acetate, methyl acrylate or other modifying monomer. For use in plastisol preparation, such polymeric material should be in the form of a free flowing fine particle size powder.

The polymeric material is plasticised with a plasticiser chosen from the types normally employed for the preparation of plasticised polyvinyl chloride compositions. Suitable plasticisers include monomeric esters such as, for example, di-(2 ethylhexyl) phthalate, di-(2 ethylhexyl) sebacate or tri-tolyl phosphate and polymeric esters such as polyglycol adipate.

The unsaturated monomeric ester is derived from either an unsaturated alcohol and saturated acid, for example, di-allyl phthalate, a saturated alcohol and unsaturated acid, for example, ethylene glycol maleate or an unsaturated alcohol and an unsaturated acid, for example, di-allyl maleate. A preferred unsaturated monomeric ester is di-allyl phthalate. The unsaturated monomeric ester and plasticiser are used in an amount of from 15–60%, preferably 30–50% by weight of the total plastisol. The unsaturated monomeric ester is used in an amount of 7.5–40%, preferably 15–35% by weight of the total plastisol.

The addition of the unsaturated monomeric ester improves the cohesive and adhesive strength of the plastisol after it has been cured. The curing process consists of heating the plastisol at a temperature between approximately 130° and 200° C. for a period of 2 to 45 minutes. It is preferred to cure the plastisol by heating it at a temperature of between 150° and 170° C. for 20 to 30 minutes. This results in proper gelatinisation of the plastisol and also polymerisation of the unsaturated monomeric ester which is brought about by the inclusion in the plastisol of between 2.5 and 12.5% by weight of curing catalyst, based on the amount of unsaturated monomeric ester. Suitable curing catalysts include tertiary butyl perbenzoate, dicumyl peroxide, and benzoyl peroxide.

The adhesion promoter, as mentioned above is an alkaline earth metal oxide or a mixture of alkaline earth metal oxides. Calcium oxide and magnesium oxide are particularly suitable examples. The adhesion promoter must be stable at the curing temperature and be compatible with the other components of the plastisol. It should not interfere with the polymerisation of the unsaturated monomeric ester and should also be of a fine particle size. A suitable particle size would be such that all particles pass a 200 mesh sieve.

The adhesion promoter can be present in the plastisol to the extent of 10–50% by weight, preferably 10–30% by weight. Furthermore, the amount of adhesion promoter in the plastisol may vary from 20–200%, preferably 40–120%, by weight of the polyvinyl chloride or vinyl chloride copolymer present in the plastisol. Whilst its addition does not, as will be shown below, increase the thermal stability of the system, it imparts to the plastisol the property of good adhesion retention at elevated temperature, even in the presence of mineral oil.

Varying proportions of fillers, thickening agents, viscosity, modifying agents and pigments may optionally be added.

The plastisol of this invention may be used to form an adhesive bond between two substrates including metals, resin treated papers, woods, ceramics or plastics. Bonds between a metal and a resin treated paper are particularly useful.

The bond is formed by applying a layer of plastisol to the surface of one or both of the substrates, bringing the two surfaces into suitable contact and heating this assembly at 130 to 200° C. for 2 to 45 minutes.

The invention will now be further illustrated with respect to the following examples. In these examples the weights of components are expressed as parts per hundred parts by weight of the total composition.

EXAMPLE 1

A series of mixes having the following compositions was prepared.

| Plastisol | A | B | C |
| --- | --- | --- | --- |
| Polyvinyl chloride | 17.3 | 18.0 | 17.7 |
| Dioctyl phthalate | 9.2 | 9.6 | 9.7 |
| Diallyl phthalate | 30.7 | 32.3 | 31.6 |
| Tertiary butyl perbenzoate | 2.8 | 2.9 | 2.8 |
| Finely divided silica | 1.0 | 1.1 | 1.1 |
| Calcium carbonate | 34.4 | | 35.5 |
| Calcium oxide | | 36.1 | |
| Dibasic lead phosphite | 2.3 | | |
| Lead phthalate | 2.3 | | |
| Organo tin stabiliser | | | 1.6 |

A sample of each mix was heated in air for 11 hours at 180° C. and then visually assessed for colour degradation. It was shown that plastisol B discoloured more than either plastisol A or plastisol C. These results show that the plastisol formulation containing calcium oxide, but no conventional heat stabilising agent is less heat stable than the other two plastisols which do contain conventional heat stabilising agents.

The inner surface of a flat metal end cap, of the type used in oil filter assembly manufacture, was spread with a thin layer of plastisol A. A pleated resin impregnated paper filter body was placed in position so that the open ends of the filter body were embedded in the fluid plastisol A composition to form an assembly which was heated for 20 minutes at 150° C. Two similar filter assemblies were prepared with the aid of plastisol B and plastisol C. The cured filter assemblies were then immersed in a mineral oil, conforming to SAE 30, at 135° C. and maintained at this temperature for 500 hours. At the end of this period the assemblies were removed from the oil and allowed to cool. The metal cap/paper element joints were then examined and their strength and nature of eventual failure under load observed.

Plastisol A.—Little or no retained strength, assembly broke at plastisol/metal interface. Marked corrosion of metal cap.

Plastisol B.—Good retained strength. The assembly broke in the paper and there was no failure at the plastisol/metal interface. When the plastisol was scraped from the metal no signs of corrosion were noted.

Plastisol C.—Little or no retained strength. Assembly broke at plastisol/metal interface and there was marked corrosion of the metal.

These results show that there was little or no retained strength of an adhesive bond derived from a plastisol containing calcium carbonate after subjection to the immersion test. Marked corrosion of a metal cap also took place. Replacement of the calcium carbonate in the plastisol by calcium oxide resulted in marked retention of the strength of the adhesive bond after the immersion test and virtually no corrosion of the metal cap.

EXAMPLE 2

A series of plastisols was prepared having the composition as set out in Table I below.

TABLE I

| Reference number | 1 | 2 | 3 | 4 | 5 | 6 | 7 | 8 | 9 |
| --- | --- | --- | --- | --- | --- | --- | --- | --- | --- |
| Polyvinyl chloride | 13.0 | 15.6 | 17.3 | 17.3 | 17.3 | 17.3 | 17.3 | 17.3 | 17.3 |
| $C_7$-$C_9$ phthalate | 7.0 | 8.4 | 9.2 | 9.2 | 9.2 | 9.2 | 9.2 | 9.2 | 9.2 |
| Diallyl phthalate | 23.5 | 28.2 | 30.8 | 30.8 | 30.8 | 30.8 | 30.8 | 30.8 | 30.8 |
| Tert. butyl perbenzoate | 2.1 | 2.7 | 2.8 | 2.8 | 2.8 | 2.8 | 2.8 | 2.8 | 2.8 |
| Finely divided silica | 0.8 | 0.9 | 1.0 | 1.0 | 1.0 | 1.0 | 1.0 | 1.0 | 1.0 |
| Calcium carbonate | | | 4.5 | 17.25 | 25.9 | 27.5 | 29.5 | 31.0 | 32.8 |
| Calcium oxide | 50 | 40 | 30.0 | 17.25 | 8.6 | 7.0 | 5.0 | 3.5 | 1.7 |
| Dibasic lead phosphate | 1.8 | 2.1 | 2.2 | 2.2 | 2.2 | 2.2 | 2.2 | 2.2 | 2.2 |
| Lead phthalate | 1.8 | 2.1 | 2.2 | 2.2 | 2.2 | 2.2 | 2.2 | 2.2 | 2.2 |

Two oil filter assemblies of a standard type used for automobile lubrication filtration were prepared from each plastisol as follows.

The inner surface of two flat metal end caps, which were made from tin plate, was coated with a thin layer of plastisol. A star section type pleated porous paper filter element, which was impregnated with a phenol formaldehyde resin, was placed in position between the two end caps so that each end of the filter element made firm contact with one of the coated surfaces of the end caps. This assembly was heated for 20 minutes at 150° C. to effect curing of the plastisol.

After standing at room temperature for a minimum of 24 hours, one sample of a cured filter assembly that had been prepared from each plastisol was subjected to a tensile strength test. The pull required to force these assemblies apart is recorded in Table II below under the heading "Original Strength (lbs.)."

The remaining filter assembly prepared from each plastisol was immersed in a mineral oil conforming to SAE 30 grade which was continuously maintained at 135° C. At the end of 504 hours immersion the filter assembly was removed from the oil, allowed to cool and tested for tensile strength. The results of these tensile strength tests are shown in Table II.

TABLE II

| Plastisol number | Percent calcium oxide | Original strength (lbs.) | Strength after 504 hrs. immersion (lbs.) |
| --- | --- | --- | --- |
| 1 | 50 | 200 | 15 |
| 2 | 40 | 200 | 35 |
| 3 | 30 | 240 | 40 |
| 4 | 17.25 | | Good |
| 5 | 8.6 | 250 | (¹) |
| 6 | 7.0 | 220 | (¹) |
| 7 | 5.0 | 265 | (¹) |
| 8 | 3.5 | 220 | (¹) |
| 9 | 1.7 | 260 | (¹) |

¹ Failed.

The results tabulated above indicated that the quantity of calcium oxide present in the plastisol made no significant difference to the original tensile strength of the plastiosl. No quantitative determination of the tensile strength obtained with reference to plastisol 4 was carried out. A visual inspection of the filter assembly however showed that there was good retention of strength of the adhesive bond. The assembly broke mainly in the paper and there was no failure at the plastisol/metal interface. No corrosion on the metal under the plastisol was noted.

After 504 hours immersion, the tensile strength of the filter assemblies bonded with plastisols 5–9 inclusive was so low that no load could be recorded on the tensile tester. It was noted with the filter assembly bonded with plastisol No. 5 that a small amount of plastisol remained on the metal surface of the end cap in one area.

The filter assemblies bonded with plastisols 1–4 all retained some tensile strength after immersion for 504 hours and in the case of the filter assemblies bonded with plastisols 2–4 this was quite sufficient for all practical purposes. On break, a considerable residue of plastisol was left on the surface of the metal end caps. Little or no signs of corrosion was noted.

The filter assemblies bonded with plastisols 6–9 failed in every case at the plastisol/metal interface, the metal being left free of adhering residual plastisol and showing marked signs of corrosion.

EXAMPLE 3

A plastisol was prepared of composition identical to that of the plastisol (ref. No. 4) set out in Table I of Example 2 with the exception that 17.25 parts of calcium oxide were replaced by an equivalent amount of magnesium oxide. A combined filter assembly was prepared using this plastisol and immersed in the mineral oil at 135° C. for 500 hours. Upon examination after this period no corrosion of the metal cap was noted. The assembly broke mainly in the paper and there was no failure at the plastisol/metal interface.

EXAMPLE 4

A coopolymer of vinyl chloride and vinyl acetate was prepared using a standard emulsion polymerisation technique—the vinyl acetate being present to the extent of 5% by weight of monomer present. A plastisol was prepared using this copolymer and amounts of other ingredients equivalent to those listed for the plastisol (ref. No. 4) set out in Table 1 of Example 2. A combined filter assembly was prepared using this plastisol and immersed in the mineral oil (SAE 30) at 135° C. for 500 hours.

Upon examination of the assembly after this period no corrosion of the metal end cap was noted. The assembly broke mainly in the paper and there was no failure at the plastisol/metal interface.

What is claimed is:

1. A heat curable adhesive plastisol having improved adhesive properties consisting essentially of
   (a) a polymer selected from the group consisting of polyvinyl chloride, vinyl chloride-vinyl acetate copolymer and vinyl chloride-methyl-acrylate copolymer,
   (b) a plasticiser,
   (c) an unsaturated monomeric ester,
   (d) a curing catalyst selected from the group consisting of tertiary butyl perbenzoate, dicumyl peroxide and benzoyl peroxide
   (e) an alkaline earth metal oxide selected from the group consisting of calcium oxide and magnesium oxide that is present to the extent of 10–50% by weight of the plastisol.

2. A heat curable adhesive plastisol having improved adhesive properties as claimed in claim 1 in which the alkaline earth metal oxide is present to the extent of 20–200% by weight of the polymer.

References Cited

UNITED STATES PATENTS

| | | | |
|---|---|---|---|
| 2,956,976 | 10/1960 | Peciura | 260—31.8X |
| 3,310,522 | 3/1967 | Takahashi et al. | 260—41 |

FOREIGN PATENTS

| | | | |
|---|---|---|---|
| 694,516 | 9/1964 | Canada | 260—899 |

MORRIS LIEBMAN, Primary Examiner

L. T. JACOBS, Assistant Examiner

U.S. Cl. X.R.

260—41B